United States Patent [19]
Sugiyama et al.

[11] Patent Number: 5,140,488
[45] Date of Patent: Aug. 18, 1992

[54] MAGNETIC TAPE CASSETTE

[75] Inventors: Masanobu Sugiyama; Hiroshi Meguro, both of Miyagi, Japan

[73] Assignee: Sony Corporation, Tokyo, Japan

[21] Appl. No.: 574,094

[22] Filed: Aug. 29, 1990

[30] Foreign Application Priority Data

Sep. 29, 1989 [JP] Japan .................. 1-114463[U]

[51] Int. Cl.⁵ .......................................... G11B 23/093
[52] U.S. Cl. ...................................... 360/132; 242/198
[58] Field of Search .............. 360/132; 242/199, 198

[56] References Cited

U.S. PATENT DOCUMENTS

| | | | |
|---|---|---|---|
| 4,644,433 | 2/1987 | Horikawa et al. | 360/132 |
| 4,646,190 | 2/1987 | Meguro | 360/132 |
| 4,676,453 | 6/1987 | Komiyama et al. | 242/200 |
| 4,750,074 | 6/1988 | Oishi | 360/132 |
| 4,843,510 | 6/1989 | Meguro et al. | 242/198 X |

FOREIGN PATENT DOCUMENTS 0323199 7/1989 European Pat. Off. .

Primary Examiner—John H. Wolff
Attorney, Agent, or Firm—Lewis H. Eslinger; Jay H. Maioli

[57] ABSTRACT

A magnetic tape cassette having an upper part and a lower part combined during assembly to form a unitary housing, a front lid that can be moved between an open position and a closed position, a pair of reel hubs rotatably mounted within the cassette housing for winding a tape thereon, and a hub lock member for locking the pair of reel hubs, includes a structure to temporarily secure the hub lock member to the upper part in a range outside a normal movable range of the hub lock member. This structure is formed as a cut-away portion having a predetermined width in its movable direction formed on the hub lock member and a stopper portion formed on the lower part in association with the cut-away portion, so that an edge of the cut-away portion comes in contact with the stopper portion to prevent the hub lock member from being once again secured to the upper part once the housing is assembled.

4 Claims, 6 Drawing Sheets

MAGNETIC TAPE CASSETTE

BACKGROUND OF THE INVENTION

1. Field of the Invention

The present invention relates generally to magnetic tape cassettes and more particularly to a magnetic tape cassette suitable for use with a digital audio tape recorder.

2. Description of the Background

A digital audio tape recorder, which is now known as DAT, is now commercially available to permit the public to digitally record an analog signal, such as an acoustic signal, on a magnetic tape or to reproduce a digitally recorded signal therefrom. The digital audio tape recorder employs a rotary head to provide a recording format in which the digital signal is recorded with a relatively high data density, when compared with a stationary head.

In the magnetic tape cassette used in such high density recording, when the magnetic tape is smudged with fingerprints, oily compounds, dust or the like, a dropout occurs in the reproduced signal. Therefore, the magnetic tape has to be sealed within the tape cassette as tightly as possible so that it can be protected from fingerprints, dust smudges, and the like.

A magnetic tape cassette shown in FIGS. 1 to 6 has previously been proposed for such a purpose, and Japanese Utility Model Laid-Open Gazette No. 1-017078 describes this kind of magnetic tape cassette.

Figure 1:
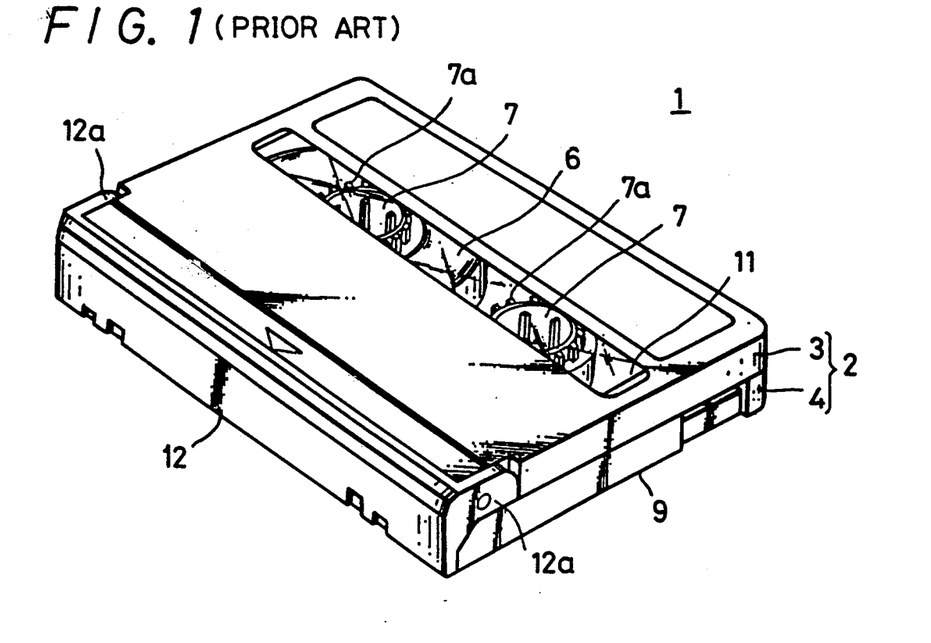
FIG. 1 is a perspective view of an example of a previously proposed magnetic tape cassette.
Figure 2:
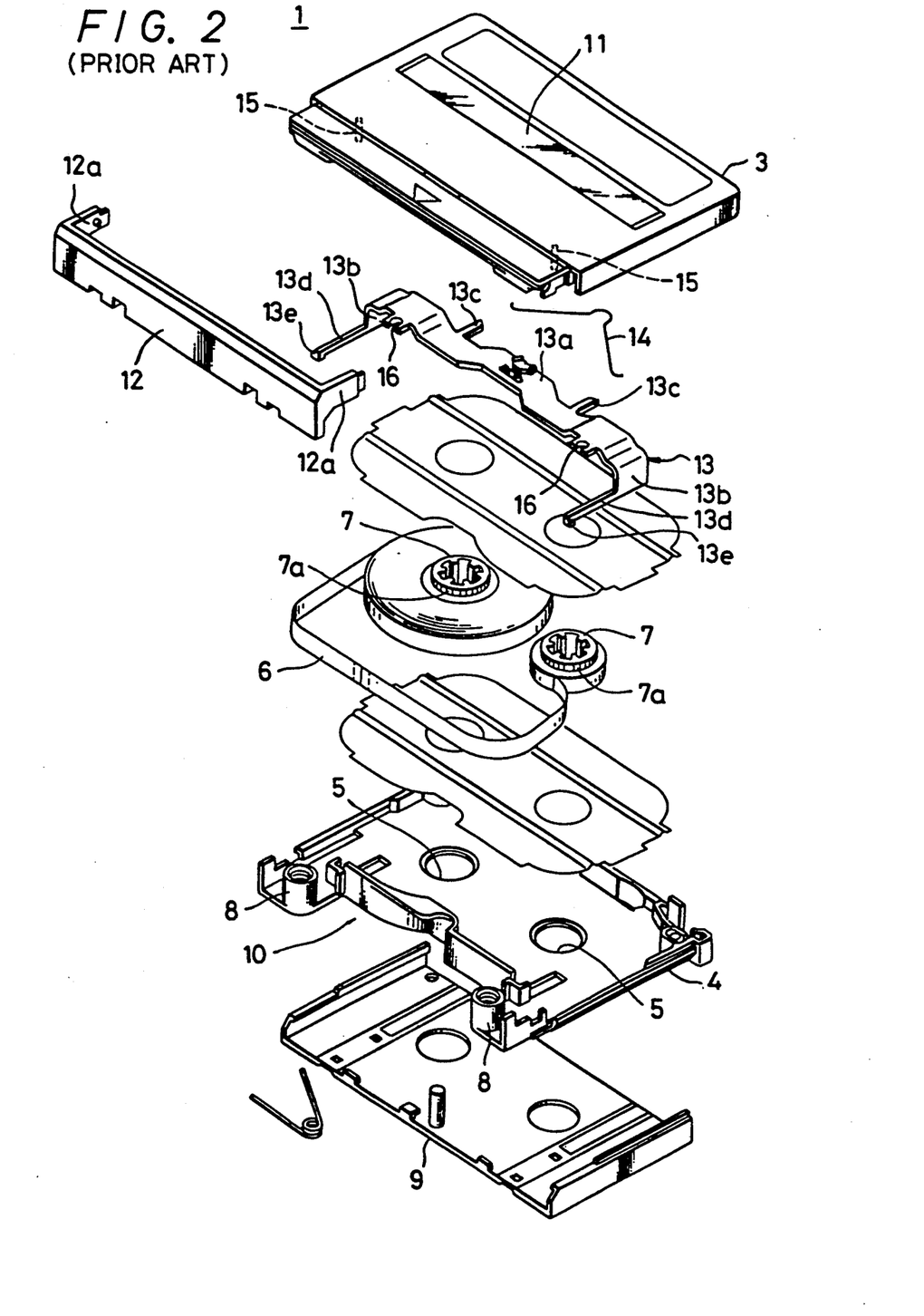
FIG. 2 is an exploded perspective view of the magnetic tape cassette shown in FIG. 1.

FIG. 1 is a perspective view of a previously proposed magnetic tape cassette 1, in which a cassette housing shown generally at 2 comprises an upper half or part 3 and a lower half or part 4, which parts are secured together by conventional means, such as screws or the like (not shown). In lower part 4, as shown in FIG. 2, a pair of right and left reel shaft insertion apertures 5 are formed. A pair of reel hubs 7 are located within the cassette housing 2 and are rotatably inserted into the pair of reel shaft insertion apertures 5, and a magnetic tape 6 is wound around the pair of reel hubs 7. Magnetic tape 6 is guided by a pair of tape guide posts 8 formed at the left and right front corners of lower part 4, so that magnetic tape 6 is exposed along the front portion of cassette housing 2.

A pocket portion or cut-away area 10 is formed as a recess at the front surface of the lower part 4, corresponding to the location where magnetic tape 6 is exposed at the front surface of cassette housing 2. Pocket portion 10 is provided so that when magnetic tape cassette 1 is loaded into a digital audio tape recording and/or reproducing apparatus (now shown), and the front lid 12 is raised, a tape loading guide member of the apparatus can enter pocket portion 10 to pull the magnetic tape 6 out and around the rotary head drum in the tape loading operation.

A transparent window portion 11 is formed on upper part 3 of cassette housing 2, so that the user can visually confirm the amount of magnetic tape 6 wound around respective ones of the reel hubs 7.

Front lid 12 is rotatably supported on front end portions of upper part 3 of cassette housing 2 by two side plate portions 12a attached the two respective sides of cassette housing 2, so as to open and/or close the front of the cassette housing 2 where magnetic tape 6 is exposed. When magnetic tape cassette 1 is not in use, front lid 12 closes the front portion of cassette housing 2 where magnetic tape 6 is exposed, so that cassette housing 2 completely encloses and protects magnetic tape 6. At the time when magnetic tape cassette 1 is loaded into the digital audio tape recorder, the tape loading mechanism of the recorder rotates front lid 12 upwardly to expose magnetic tape 6.

A slidable plate member or slider 9 is movably mounted on the lower surface of lower part 4, so as to move slidably in the front to back direction of cassette housing 2. When magnetic tape cassette 1 is not in use, slider 9 is moved to it at the front closing position by action of a biasing spring 9', so that slider 9 closes the bottom of pocket portion 10, as well as closing the reel shaft insertion apertures 5 of lower part 4. When magnetic tape cassette 1 is loaded into the digital audio tape recorder, slider 9 is moved to the rear opening position by the tape loading mechanism of the apparatus, thereby opening pocket portion 10 and reel shaft insertion apertures 5.

Friction reducing sheets 20, 21 are provided on respective sides of the tape 6 as it is wound on reels 7 to cut down on friction between the housing 2 and the tape 6 as the tape is wound and unwound in the assembled cassette 1.

Further, cassette housing 2 incorporates therein a hub locking member 13 that is freely movable in the front to rear direction so as to interact with reel hubs 7 to avoid unnecessary rotation of reel hubs 7 when the cassette is not in use. This hub lock member 13 is comprised of a horizontal support plate portion 13a extending along an inner surface of upper part 3 in front of reel hubs 7 and side plate portions 13b extending downward from the ends of support plate portion 13a to form an upside-down, substantially U-shaped element when seen in front elevation. A pair of hub engaging elements 13c protrude from a rear edge of support plate portion 13a and are located to engage groove portions 7a of the two reel hubs 7. Two arm portions 13d project forward from the respective lower end portions of the side plate portions 13b, and engaging protrusions 13e are arranged at respective ends of arm portions 13d. These engaging protrusions 13e are provided to engage front lid 12, as will be described hereinbelow.

Figure 3:
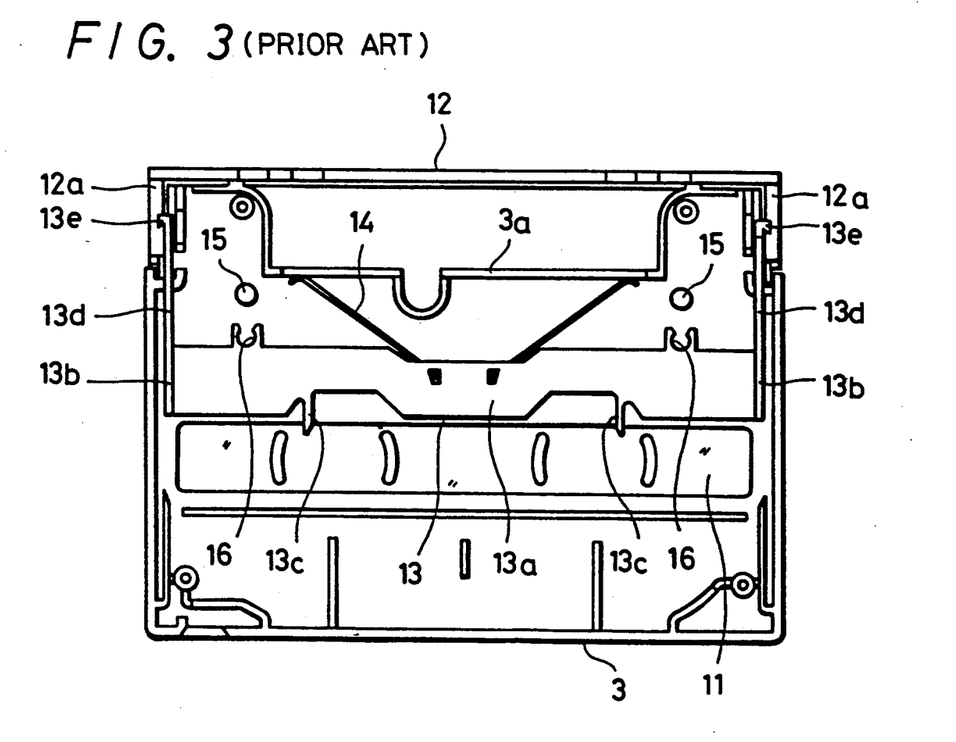
FIG. 3 is a bottom plan view of an upper portion of the magnetic tape cassette shown in FIG. 1.
Figure 5:
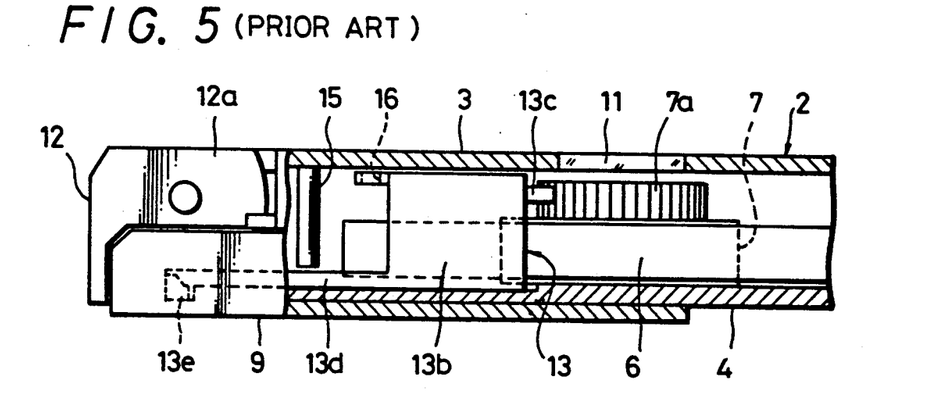
FIG. 5 is a side elevation in partial cross-section of the magnetic tape cassette shown in FIG. 1 and illustrating the condition that the magnetic tape cassette is not in use and the reel hub is locked.

A torsion spring 14 is attached at a central portion of the support plate portion 13a of hub lock member 13, so that hub lock member 13 is always spring-biased in the locking direction by this torsion spring 14. More specifically, two end portions of torsion spring 14 extend outwardly to make contact with a front wall 3a of upper part 3, as shown in FIG. 3. Thus, hub lock member 13 is always spring-biased in the rearward direction, that is, in the direction in which engaging members 13c are engaged with engaging grooves 7a of reel hubs 7, so that when magnetic tape cassette 1 is not in use reel hubs 7 are locked against rotation. In this way, magnetic tape 6 is protected from being unwound and unduly slackened within the cassette. This reel locked state is shown in FIG. 5.

Figure 6:
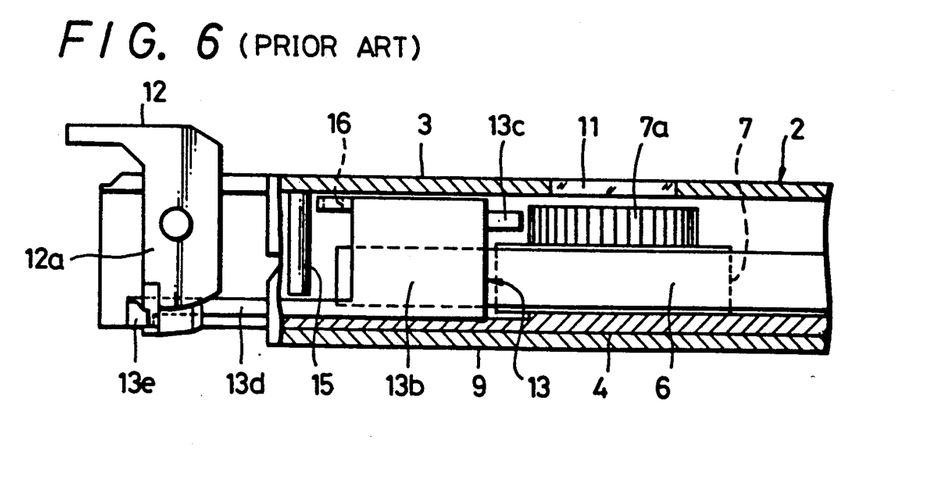
FIG. 6 is a side elevational in partial cross-section of the magnetic tape cassette shown in FIG. 1 and illustrating the condition that the magnetic tape cassette is in use and the reel hub is released from being locked.

When magnetic tape cassette 1 is loaded into the digital audio tape recorder and front lid 12 is rotated upward as described above, the lower edges of side plate portions 12a of front lid 12 comes in contact with engaging portions 13e that extend outwardly at the two sides of hub lock member 13, whereby hub lick member 13 is moved in the direction so that engaging members 13c are disengaged from engaging grooves 7a of reel hubs 7, against the spring-biasing force of torsion spring 14. Thus, reel hubs 7 are released from the locked state and placed in a free-rotation state, which is shown in FIG. 6.

When magnetic tape cassette 1 having the above-described hub lock member 13 is assembled, hub lock member 13 is mounted in advance on upper part 3, before upper part 3 and lower part 4 are fastened together. That is, hub lock member 13 is initially fastened to upper part 3 and, so that at the time upper part 3 and lower part 4 are fastened together, hub lock member 13 is incorporated within the assembly of cassette housing 2.

More particularly, in the structure used for temporarily assembling hub lock member 13 to upper part 3, fixed pins 15 project downwardly from an inner surface of upper part 3 in the vicinity of cut-away portion 10. In correspondence therewith two, engaging, convex, open portions 16 are formed on the front edge of support portion 13a of hub lock member 13. Therefore, when hub lock member 13 is moved outside of its normal movable range, that is, when hub lock member 13 is moved ahead of the lock releasing position where front lid 12 is opened to the maximum, engaging concave portions 16 are engaged with fixed pins 15, whereby hub lock member 13 is temporarily fastened to upper part 3. The diameters of fixed pins 15 and the size of the open portions 16 are selected so that lock member 13 can be attached to upper part 3 by applying only a small pressure.

Thus, when upper part 3 having hub lock member 13 temporarily secured thereto is combined with lower part 4, in which magnetic tape 6, reels 7 and the like have been partly assembled, the overall magnetic tape cassette can be assembled with ease.

Figure 4:
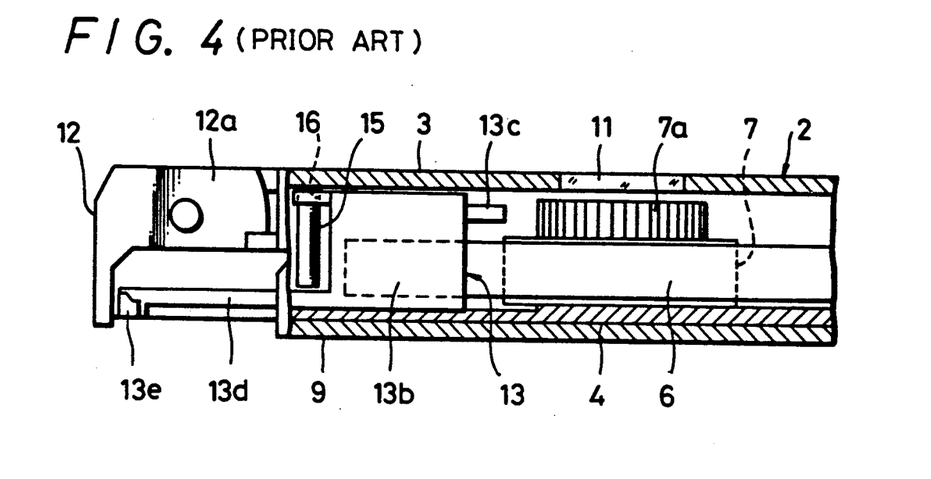
FIG. 4 is a side elevation in partial cross-section of the magnetic tape cassette shown in FIG. 1 and illustrating the condition that a hub lock member of the magnetic tape cassette is temporarily fastened to the upper part.

Once the magnetic tape cassette has been assembled as described above and hub lock member 13 is temporarily fastened to pins 15 of upper part 3, as shown in FIG. 4, the ends of arm portions 13d of hub lock member 13 can be pushed rearwardly and the engagement between engaging concave portions 16 and fixed pins 15 is released, thereby permitting hub lock member 13 to become movable. The releasing of engagement between portions 16 and pins 15 can be done manually or by the cassette assembly machine.

When front lid 12 is closed during nonuse of the magnetic tape cassette, as shown in FIG. 5, hub lock member 13 locks reel hub 7 by engaging protruding elements 13c with engaging slit portions 7a of reel hubs 7, in the rearmost movable position of hub lock member 13 under action of spring 14. When front lid 12 is rotated in its opening direction upon use of the magnetic tape cassette, as shown in FIG. 6, hub lock member 13 is simultaneously moved forward so that protruding elements 13c of hub lock members 13 are disengaged from engaging slit portions 7a, thereby releasing reel hubs 7 from the locked condition.

When hub lock member 13 is moved in consort with the opening and closing of front lid 12, hub lock member 13 is generally precluded from once again being temporarily fastened to upper part 3. More specifically, engaging concave portions 16 are engaged with fixed pins 15 generally only when hub lock member 13 has been moved to a position that is ahead of the normal reel hub lock releasing position. Thus, even though hub lock member 13 is moved in consort with the opening and closing of front lid 12 in a predetermined range, engaging concave portions 16 can be prevented from being engaged with fixed pins 15 by keeping the distance therebetween outside of that predetermined range of movement.

The above-described structure for temporarily fastening the hub lock member is described in Japanese Utility Model Application 62-199244 assigned to the assignee hereof.

Nevertheless, the magnetic tape cassette having the above-mentioned hub lick member temporary fastening structure has the unavoidable disadvantage that although hub lock member 13 can be prevented from being once again temporarily fastened to upper part 3 in the normal movement of hub lock member 13 in consort with the opening and closing of front lid 12, if the magnetic tape cassette is inadvertently dropped there is then the substantial possibility that hub lock member 13 will be once again temporarily fastened to upper part 3.

More specifically, when cassette housing 2 receives a considerable mechanical shock hub lock member 13 can be accidentally moved beyond its normal range so that engaging concave portions 16 can again be engaged with fixed pins 15, that is, the temporarily fastened state shown in FIG. 4 is revisited. As a result, during nonuse of the magnetic tape cassette and after such mechanical shock, the magnetic tape cassette is in the condition that the reel hubs 7 are released from being locked, so that magnetic tape 6 can become unduly slackened, thereby rendering hub lock member 13 generally useless.

OBJECTS AND SUMMARY OF THE INVENTION

Accordingly, it is an object of the present invention to provide an improved magnetic tape cassette that can eliminate the aforenoted shortcomings and disadvantages inherent in previously proposed tape cassettes.

It is another object of the present invention to provide a magnetic tape cassette in which a hub lock member can be positively prevented from being temporarily refastened to an upper part following assembly of the cassette housing.

It is a further object of the present invention to provide a magnetic tape cassette in which during nonuse of the cassette reel hubs can be positively locked by a hub lock member, so that the magnetic tape in the cassette can be prevented from being slackened.

According to an aspect of the present invention, a magnetic tape cassette having a cassette housing formed of an upper part and a lower part that are combined during an assembly operation to form a unit, includes a front lid that can be moved between an open position in which it opens the cassette housing and a closed position in which it closes the cassette housing, a pair of reel hubs rotatably mounted within the cassette housing for winding a tape thereon, and a hub lock member for locking the pair of reel hubs provided within the cassette housing, so that during the assembly the hub lock member is temporarily secured to the upper part at a location beyond the normal range of movement of the hub lock member. This magnetic tape cassette is constructed such that a cut-away portion having a predetermined width in the movable direction is formed on the hub lock member and an upraised stopper portion is formed on the lower part of the cassette that operates in association with the cut-away concave portion, wherein an edge portion of the cut-away concave portion comes in contact with the stopper portion so that the hub lock member is precluded from excessive travel and is prevented from once again being temporarily secured to the upper part.

These and other objects, features, and advantages, of the present invention will be apparent in the following detailed description of a preferred embodiment to be read in conjunction with the accompanying drawings, in which like reference numerals represent the same or similar parts in the several views.

DETAILED DESCRIPTION OF THE PREFERRED EMBODIMENT

A magnetic tape cassette according to an embodiment of the present invention will hereinafter be described with reference to FIGS. 7 to 11, in which like parts corresponding to those of FIGS. 1 to 6 are marked with the same reference numerals and therefore need not be described in detail.

In the magnetic tape cassette of this embodiment, in order to prevent hub lock member 13 from being temporarily fastened once again to upper part 3 after the initial assembly operation, two rectangular portions 18 are cut-away through the lower end portions of left and right side plate portions 13b of hub lock member 13. Two stopper members 19 project upwardly from the bottom portion of the lower part 4 and are dimensioned to fit into respective ones of cut-away rectangular portions 18. A cut-away portion 18 and a stopper member 19 pair are provided on each side of the tape cassette.

Each of the cut-away rectangular portions 18 has a predetermined length extending in the front to rear direction in consideration of the predetermined movement stroke of hub lock member 13. In other words, hub lock member 13 can move in the front to back direction within a range defined by the front and rear edges of cut-away rectangular portion 18, as contacted by respective ones of the stopper members 19.

Figure 8:
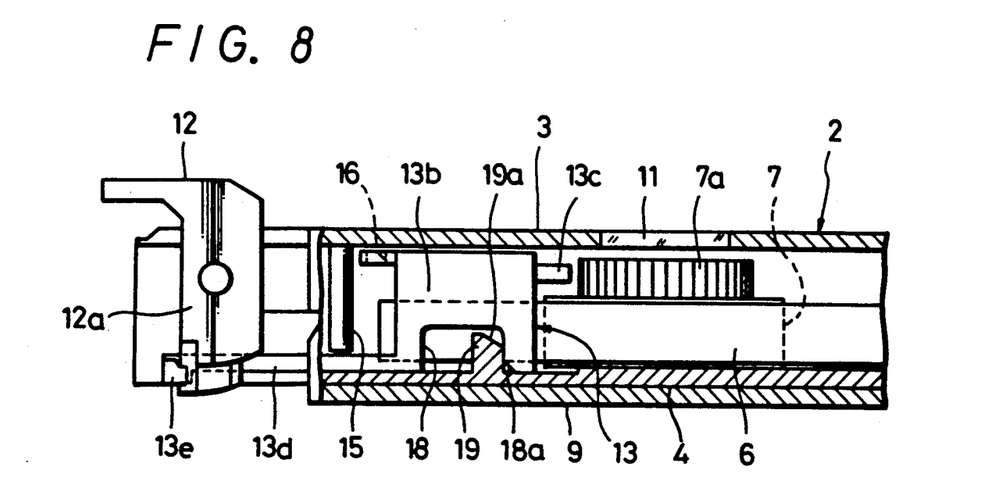
FIG. 8 is a side elevation in partial cross-section of the magnetic tape cassette of FIG. 7 and illustrating the condition that the magnetic tape cassette is in use and the reel hub is released from being locked.

As shown in FIG. 8, each stopper member 19 is formed standing upright from the bottom portion of lower part 4 at a position in which it comes in contact with the rear edge of the cut-away rectangular portion 18 when hub lock member 13 reaches the position at which front lid 12 is opened to its maximum, that is, the lock releasing position of the reel hub. Because of this contact hub lock member 13 is prevented from being moved forward or backward beyond its normal movable range in consort with the opening and closing of front lid 12.

Figure 7:
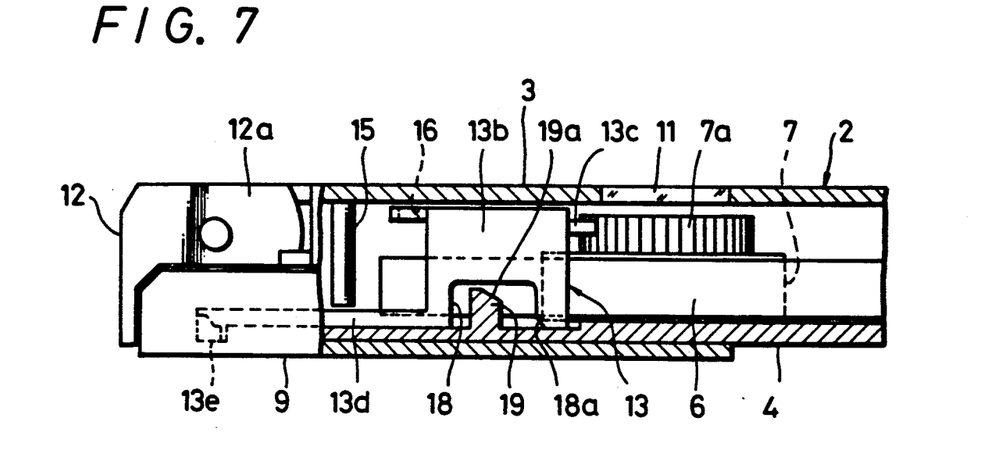
FIG. 7 is a side elevation in partial cross-section of a magnetic tape cassette according to an embodiment of the present invention and illustrating the condition that the magnetic tape cassette is not in use and the reel hub is locked.

In accordance with this embodiment of the present invention the lower edge portion of the rear side of each cut-away rectangular recess 18 is chamfered to provide a chamfered portion 18a, while the upper rear edge of each stopper member 19 is also tapered to provide a slanted edge portion 19a that is inclined downward, as shown in FIGS. 7 and 8.

Figure 9:
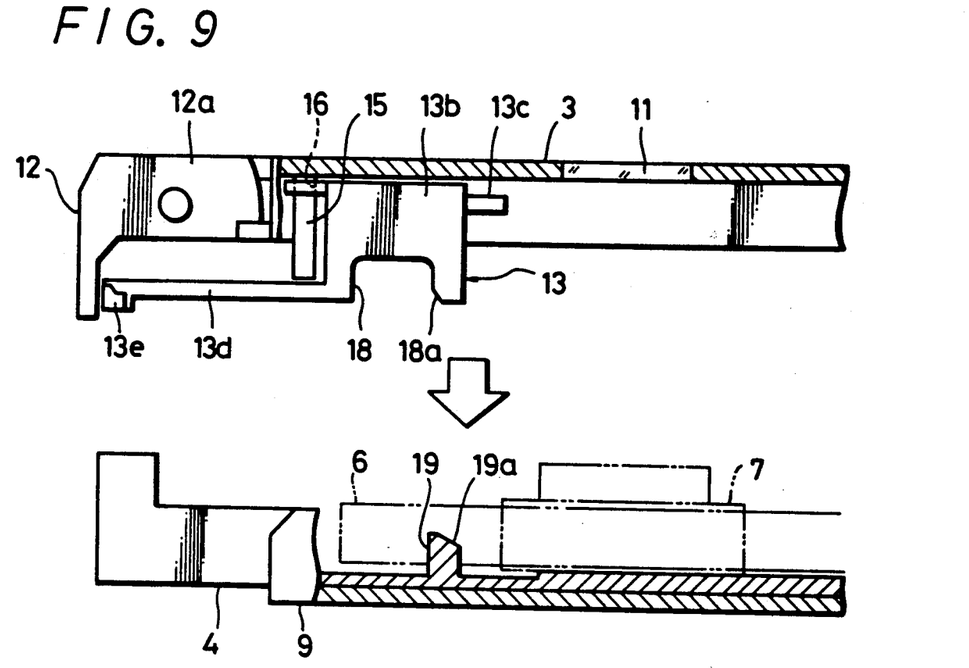
FIG. 9 is a side elevation in partial cross-section of showing the assembly-process of a magnetic tape cassette according to an embodiment of the present invention.
Figure 10A:
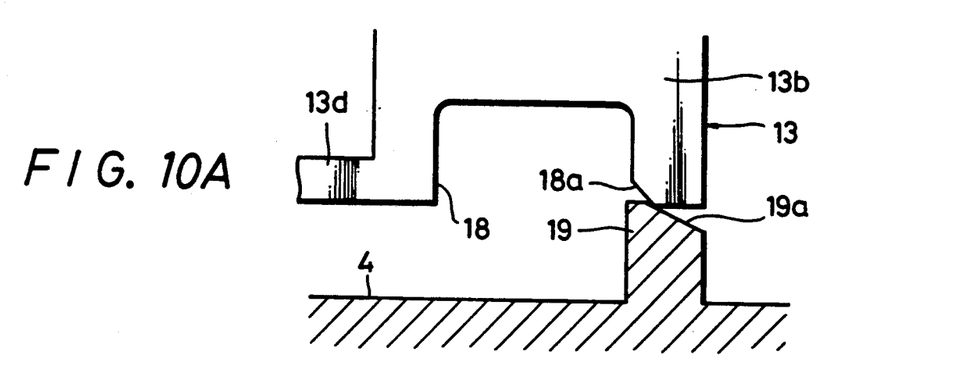
FIGS. 10A and 10B are side elevations showing portions of the cassette of FIG. 9 in more detail in order to show an operation of the present invention when the magnetic tape cassette is assembled.
Figure 10B:
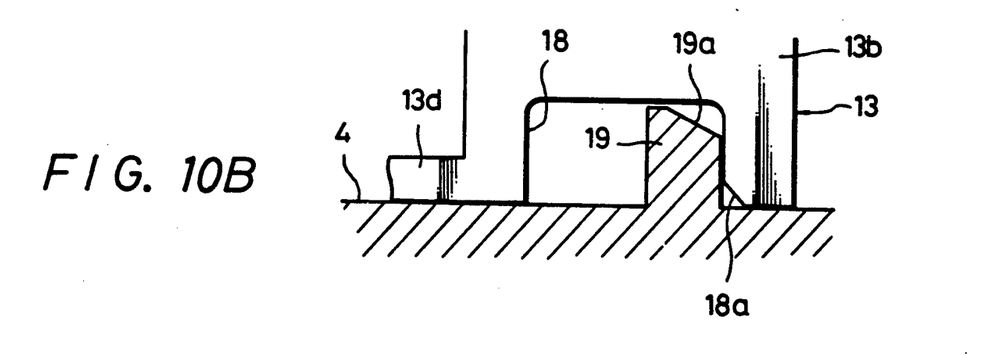
Figure 11:
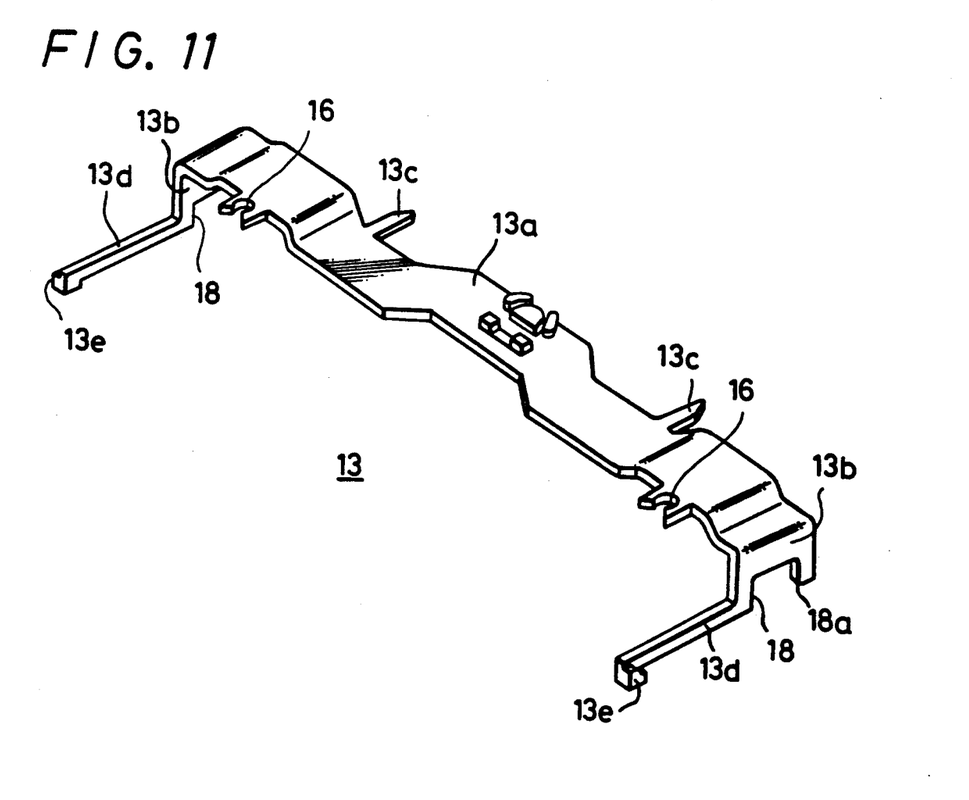
FIG. 11 is a perspective view of a hub lock member used in the magnetic tape cassette according to an embodiment of the present invention.

In the assembly process of the above-described embodiment just as in the assembly of the previously proposed cassette, hub lock member 13 is temporarily fastened to upper part 3 prior to final assembly and then upper part 3 to which hub lock member 13 is temporarily fastened is combined with lower part 4 to which magnetic tape 6, reel 7, and the like have already been assembled. The relationship of hub lock member 13 and lower part 4 in this condition is shown in FIG. 9. At that time, hub lock member 13 is located such that chamfered portion 18a formed on the lower rear edges of each cut-away rectangular portion 18 thereof is brought in contact with tapered edge portion 19a of each stopper member 19, as shown in FIG. 10A. In this condition, when upper part 3 is further pushed toward lower part 4, chamfered portion 18a moves rearwardly along tapered edge portion 19a of stopper portion 19 until it slides over the end of stopper portion 19, as shown in FIG. 10B. Thus, hub lock member 13 is forced rearwardly, so that engaging concave portions 15 are disengaged from fixed pins 15 and hub lock member 13 is released from its temporarily fastened attachment to the upper part 3.

As described above, in the magnetic tape cassette in which hub lock member 13 is made movable, similarly to the previously proposed magnetic tape cassette, when front lid 12 is closed upon nonuse of the magnetic tape cassette, each real hub 7 is locked by hub lock member 13, as shown in FIG. 7. Further, when front lid 12 is rotated in its opening direction during use of the magnetic tape cassette, hub lock member 13 is moved toward the front of the cassette in consort with the opening of front lid 12, so that reel hub 7 is released from the locked condition, as shown in FIG. 8.

If while not in use the cassette housing receives a considerable mechanical shock, so that hub lock member 13 is forced to move in the forward direction with a relatively large force, the rear side edges of the rectangular cut-away portions 18 are brought in contact with the rear edges of stopper portions 19, so that hub lock member 13 is prevented from being moved beyond its normal movable range when front lid 12 is opened and closed. Thus, engaging concave portions 16 can be prevented from being engaged with fixed pins 15, whereby the hub lock member 13 is prevented from once again being temporarily fastened to upper part 3.

According to the magnetic tape cassette of the embodiment described above, hub lock member 13 can be completely prevented from being temporarily fastened to the upper part 3 after the initial fastening and release during assembly, in nonuse of the magnetic tape cassette reel hubs 7 are positively locked by hub lock member 13 and magnetic tape 6 is prevented from being slackened. In addition, the structure for preventing the hub lock member from being once again fastened to the upper part 3 is relatively simple, in that rectangular cut-away portions 18 are formed on existing hub lock member 13 and the stopper portions 19 arranged project upright from existing lower part 4. Therefore, the structure of this embodiment can realized by only slightly modifying the design and arrangement of the previously proposed magnetic tape cassette, thereby providing an improved magnetic tape cassette without substantial cost increase.

Furthermore, during assembly of the magnetic tape cassette of this embodiment, at the same time that upper part 3 and lower part 4 are being combined, hub lock member 13 is automatically released from being temporarily fastened to upper part 3 so that, unlike the previously proposed cassette a further operation to release hub lock member 13 from being temporarily fastened to the upper part 3 after the assembly process is ended is not required. There is then the substantial advantage that the assembly work can be carried out more efficiently.

While a preferred embodiment of the present invention has been described so far, the present invention is not limited thereto and various modifications and variations can be made, such as changing the positions of the cut-away portion 18 and the stopper portion 19 and the like.

As described above, in the magnetic tape cassette of the present invention, the rectangular cut-away portion is formed on the hub lock member and the stopper portion is formed on the cassette part, so that when the rear edge portion of the cut-away portion comes in contact with the stopper portion, the hub lock member can be inhibited from being moved beyond its normal movable range required for opening and closing the cassette lid. Thus, when the magnetic tape cassette is dropped unintentionally or somehow receives a substantial mechanical shock, the hub lock member can be prevented from being moved beyond its normal movable range, and the hub lock member can be prevented from becoming fastened to the cassette upper part once again. Therefore, when the magnetic tape cassette is not in use, the reel hub thereof is positively locked by the hub lock member, and the magnetic tape is prevented from becoming unduly slackened.

Having described preferred embodiments with reference to the accompanying drawings, it is to be understood that the invention is not limited to those precise embodiments and that various changes and modifications could be effected by one skilled in the art without departing from the spirit or scope of the novel concepts of the invention, as defined in the appended claims.

What is claimed is:

1. A magnetic tape cassette having an upper part and lower part combined during assembly to form a housing, a front lid that can be moved between an open position and a closed position, a pair of reels hubs rotatably mounted within the housing for winding a tape thereon, and a hub lock member movable within the housing for locking the pair of reel hubs, so that during assembly the hub lock member is temporarily secured to said upper part at a position outside a typical movable range of the hub lock member, said magnetic tape cassette comprising:

a cut-away portion formed in said hub lock member and having a predetermined length in a movable direction of said hub lock member; and a stopper element formed on said lower part in juxtaposition to said cut-away portion, whereby following assembly a front or rear edge portion of said cut-away portion comes in contact with a respective front or rear edge portion of said stopper portion, so that said hub lock member is prevented from being temporarily secured to said upper part once again.

2. The magnetic tape cassette according to claim 1, in which said cut-away portion is formed on each side of said hub lock member and said stopper convex portion is formed on each sides of said lower part.

3. The magnetic tape cassette according to claim 1, in which said stopper portion has formed on its upper end edge a tapered portion inclined downwardly in a rearward direction relative to the cassette.

4. The magnetic tape cassette according to claim 3, in which said cut-away portion has a chamfered portion at a lower end of a rear side edge.

* * * * *